US011332297B2

(12) United States Patent
Anand et al.

(10) Patent No.: US 11,332,297 B2
(45) Date of Patent: May 17, 2022

(54) PROTECTIVE PACKAGING AND DELIVERY

(71) Applicant: Amrita Vishwa Vidyapeetham, Tamil Nadu (IN)

(72) Inventors: Madhumati Anand, Kerala (IN); Gayathri Manikutty, Kerala (IN); Sunitha Kanthimathi, Kerala (IN); Rao R. Bhavani, Kerala (IN)

(73) Assignee: Amrita Vishwa Vidyapeetham

(*) Notice: Subject to any disclaimer, the term of this patent is extended or adjusted under 35 U.S.C. 154(b) by 150 days.

(21) Appl. No.: 16/917,354

(22) Filed: Jun. 30, 2020

(65) Prior Publication Data

US 2021/0339936 A1    Nov. 4, 2021

(51) Int. Cl.
*B65D 81/07* (2006.01)
*B65D 81/03* (2006.01)
*B65D 65/46* (2006.01)

(52) U.S. Cl.
CPC ......... *B65D 81/07* (2013.01); *B65D 65/466* (2013.01); *B65D 81/03* (2013.01)

(58) Field of Classification Search
CPC ...... B65D 81/07; B65D 81/03; B65D 65/466; B65D 81/02; B64D 1/14; B64C 2201/128
USPC ................................ 206/583, 591, 421, 433
See application file for complete search history.

(56) References Cited

U.S. PATENT DOCUMENTS

| | | | | |
|---|---|---|---|---|
| 2,295,590 | A * | 9/1942 | Manson | B64D 1/02 206/521 |
| 3,044,161 | A * | 7/1962 | Morrison | F25D 23/063 29/445 |
| 9,536,216 | B1 * | 1/2017 | Lisso | G01C 21/00 |
| 9,650,136 | B1 * | 5/2017 | Haskin | B64D 1/12 |
| 11,220,363 | B2 * | 1/2022 | Konig | G06Q 10/0832 |
| 2019/0263521 | A1 * | 8/2019 | O'Brien | B64C 39/024 |
| 2020/0071010 | A1 * | 3/2020 | Konig | B66D 1/60 |

FOREIGN PATENT DOCUMENTS

| | | | | |
|---|---|---|---|---|
| EP | 3239048 A1 * | 11/2017 | | B64C 1/08 |
| EP | 3450310 A1 * | 3/2019 | | B60L 50/60 |

* cited by examiner

*Primary Examiner* — Rafael A Ortiz
(74) *Attorney, Agent, or Firm* — Donald R. Boys; Central Coast Patent Agency LLC

(57) ABSTRACT

A system for delivery of fragile payloads involves a structure having an approximately spherical aspect composed of rigid struts and flexible tendons joining ends of struts, the flexible tendons in tension placing the struts in compression, the structure having a hollow interior, and one or more fragile items wrapped in a shock-absorbing bio-degradable material such that no fragile item contacts another, forming a payload bundle, the payload bundle joined by fibrous filaments suspending the payload within the structure. The structure carrying the payload bundle is carried to a destination by an aerial vehicle and dropped from a height to the ground, where the structure rebounds and rolls, dissipating kinetic energy gained in falling, preventing the payload bundle from striking ground surface.

20 Claims, 6 Drawing Sheets

PROTECTIVE PACKAGING AND DELIVERY

CROSS-REFERENCE TO RELATED DOCUMENTS

The present application claims priority to application No. 202041018365, filed in India on Apr. 29, 2020. All disclosure of the Indian parent application is incorporated in the instant application, at least by reference.

BACKGROUND OF THE INVENTION

1. Field of the Invention

The present invention is in the field of payload shipping services and pertains particularly to methods and apparatus for packaging fragile payloads for destination drop from an aerial delivery vehicle.

2. Discussion of the State of the Art

In the art of shipping to a client, shipping fragile products carries certain risks that must be mitigated in the way the products are handled, how the products are shipped and how the products are packaged for shipment. Fragile shipping products are required in most supply chain policies to be handled very carefully to lower the risk of damage or loss. For example, medicines and antitoxins are important fragile products for delivery to hospitals and in some cases customer destinations. These products are often shipped in fragile vials, syringes, or glass containers inside coolers or rectangular cases by ground vehicles or by air then ground vehicles because of the special care handling required.

The packaging of these products and other fragile products may be conventional and may be shock resistant but only to a degree. While products may be insured against damage from inadequate handling and packaging, there still may be an inconvenience to the client including loss of time. The supply chain may also suffer an aggregate draw on overall efficiency due to reshipment requirements from the manufacturer and or retailer to the client due to loss of fragile products during shipment. The supply chain may also suffer from limitations placed on delivery methods due to product fragility and inadequate packaging.

Therefore, what is clearly needed is a structure and method of manufacture and assembly thereof for enclosing fragile products during transportation of those products along a supply chain to an end destination.

BRIEF SUMMARY OF THE INVENTION

In one embodiment of the invention a system for delivery of fragile payloads is provided, comprising a structure having an approximately spherical aspect composed of rigid struts and flexible tendons joining ends of struts, the flexible tendons in tension placing the struts in compression, the structure having a hollow interior, and one or more fragile items wrapped in a shock-absorbing bio-degradable material such that no fragile item contacts another, forming a payload bundle, the payload bundle joined by fibrous filaments suspending the payload within the structure. The structure carrying the payload bundle is carried to a destination by an aerial vehicle and dropped from a height to the ground, where the structure where the structure rebounds and rolls, dissipating kinetic energy gained in falling, preventing the payload bundle from striking ground surface.

In one embodiment the structure is assembled from a plurality of substantially planar polygonal elements, each substantially planar polygonal element comprising crossed, substantially rigid struts with tendons joining strut ends with adjacent nearest strut ends in the same polygonal element. Also, in one embodiment the plurality of substantially planar polygonal elements is joined together into the structure by joining apexes of individual substantially planar polygonal elements to apexes of others of the plurality of substantially planar polygonal elements. In one embodiment the struts are made of elongated, bio-degradable sticks and may be left on the ground or re-purposed after use. And in one embodiment the struts are made from rattan or wicker cane.

In one embodiment the tendons are made from jute string. Also, in one embodiment ends of struts are split and the tendons are inserted into the slit ends of the struts, joining the ends of struts in assembling a substantially planar polygonal element. In one embodiment tendons are stretched in assembly of the substantially planar polygonal element, placing the tendons in tension and the struts in compression. In one embodiment the shock-absorbing bio-degradable material is coir formed into a fabric, and the fabric is wrapped around individual instances of fragile items such that no two fragile items in the payload bundle contact. And in one embodiment the fibrous filaments suspending the payload are wool string.

In another aspect of the invention a method for delivery of fragile payloads is provided, comprising assembling a structure having an approximately spherical aspect composed of rigid struts and flexible tendons joining ends of struts, the flexible tendons in tension placing the struts in compression, the structure having a hollow interior, wrapping one or more fragile items in a shock-absorbing bio-degradable material such that no fragile item contacts another, forming a payload bundle, suspending the payload bundle by fibrous filaments within the structure, delivering the structure carrying the payload bundle to a destination by an aerial vehicle, and dropping the structure with the payload bundle to the ground at the destination.

In one embodiment the method comprises assembling the structure from a plurality of substantially planar polygonal elements, each substantially planar polygonal element comprising crossed, substantially rigid struts with tendons joining strut ends with adjacent nearest strut ends in the same polygonal element. Also, in one embodiment the method comprises joining the plurality of substantially planar polygonal elements together into the structure by joining apexes of individual substantially planar polygonal elements to apexes of others of the plurality of substantially planar polygonal elements. In one embodiment the method comprises making the struts of elongated, bio-degradable sticks that are left on the ground or re-purposed after use. And in one embodiment the method comprises making the struts from rattan or wicker cane.

In one embodiment the method comprises making the tendons from jute string. Also, in one embodiment the method comprises splitting ends of struts and inserting the tendons into the slit ends of the struts, joining the ends of struts in assembling a substantially planar polygonal element. Also, in one embodiment the method comprises stretching the tendons in assembly of the substantially planar polygonal elements, placing the tendons in tension and the struts in compression. In one embodiment the method comprises making the shock-absorbing bio-degradable material from coir, by forming the coir into a fabric, and wrapping the fabric around individual instances of fragile items such that no two fragile items in the payload bundle contact. And in

DETAILED DESCRIPTION OF THE INVENTION

The inventor by various embodiments described herein in enabling detail provides a three-dimensional tensegrity shield structure for protecting fragile payloads from damage which may occur during product shipping and handling. The present invention is described in enabling detail using the following examples, which may describe more than one relevant embodiment falling within the scope of the present invention.

A tensegrity is an apparatus based on a system of isolated components under a state of compression induced by joined elements in a state of continuous tension. The term tensegrity is taken from the phrase tensional integrity. Another term for describing the tensegrity concept is floating compression. A tensegrity structure is typically made up of struts and tendons which are in a state of stable equilibrium because of the way the mechanical stress is distributed in the structure. The struts are in a state of constant compression and the tendons are in a state of continual tension. No two struts in a tensegrity apparatus are connected by joints and do not impart any torque to the structure.

It has occurred to the inventor that the physics involved in the tensegrity concept may be leveraged for creating an organic and biodegradable tensegrity cage. I one unique embodiment a fragile payload may be suspended within a tensegrity cage so as not to be directly affected by a physical shock event that might otherwise damage the payload during shipment.

Figure 1:
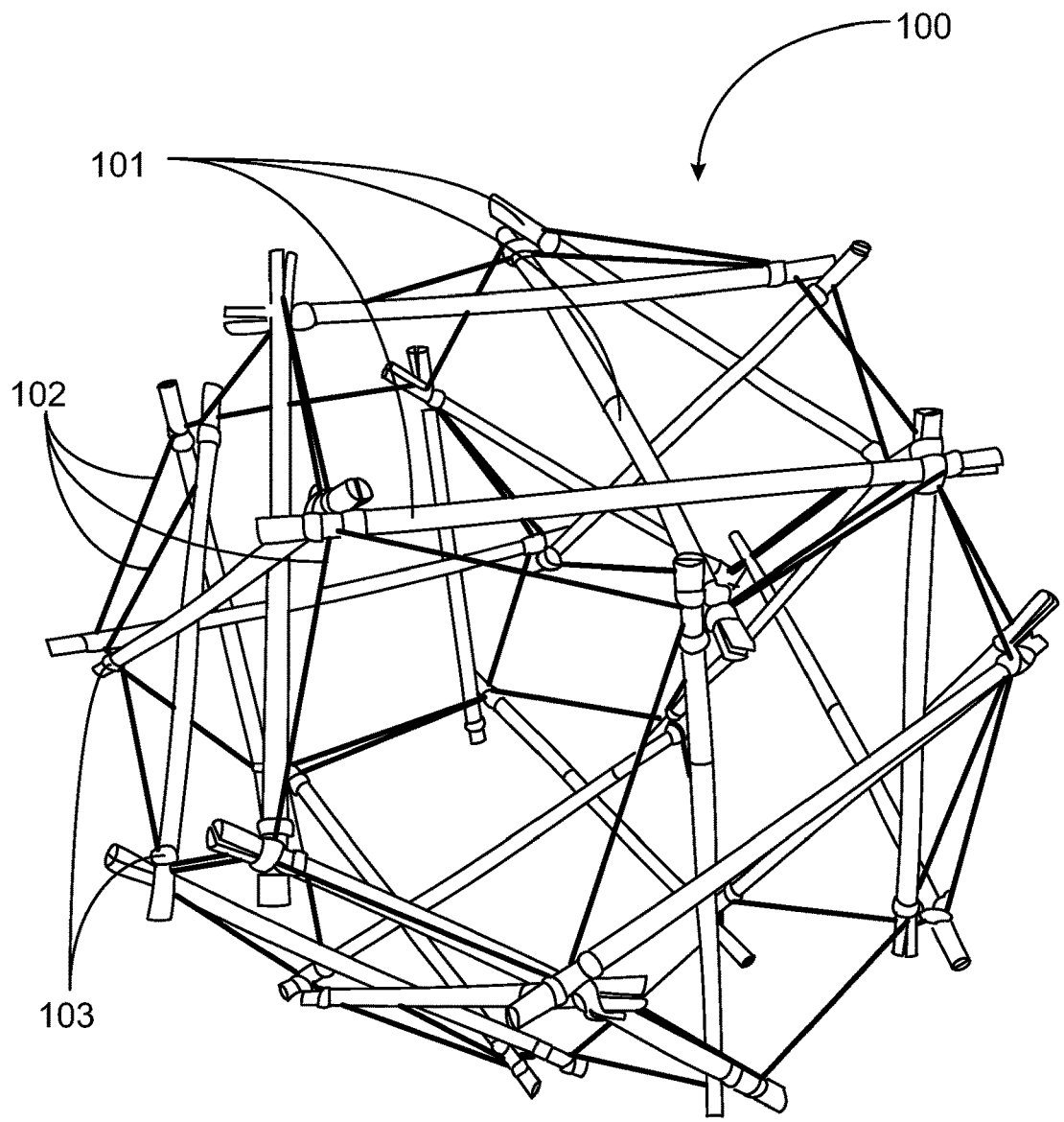
FIG. 1 is a perspective view of a tensegrity structure according to an embodiment of the invention.

FIG. 1 is a perspective view of a tensegrity structure 100 according to an embodiment of the present invention. Tensegrity structure 100 is adapted in this embodiment as a shock limiting barrier that may be used to enclose and protect a fragile payload from physical shock that may occur during product shipping, more particularly, drop shipping from an unmanned aerial vehicle (UAV). Tensegrity structure 100 is fabricated of low-cost bio-degradable materials in this example. A plurality of struts 101 may be provided in the form of rattan or wicker cane sticks.

In one embodiment, struts 101 are elongated, bio-degradable sticks and may be left on the ground or re-purposed after use. Tendons are provided to maintain the tension and compression of the structure. Tendons 102 of tensegrity structure 100 may be made of a natural bio-degradable cord like jute string. A goal of the invention is to fabricate three-dimensional tensegrity structure 100 from prefabricated two-dimensional planar cells that may be assembled to provide a cage at the time of shipping a fragile payload. Tensegrity structure 100 is a truncated octahedron tensegrity fabricated from individual hexagonal elementary cells described in more detail later in this specification.

Struts 101 may be partially split at opposing ends to a designated depth to receive tendons 102, which are jute string in one example. Cotton string 103 may be wrapped about the ends of struts 101 to prevent unwanted splitting beyond the designated split length of about two centimeters.

Figure 2:
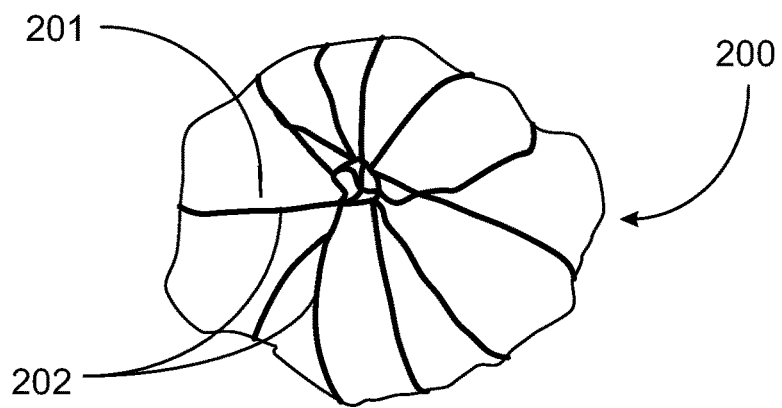
FIG. 2 is an overhead view of a wrapped payload according to an embodiment of the invention.

FIG. 2 is an overhead view of a fragile payload 200 that may be suspended within tensegrity structure 100 during shipment. Payload 200 may comprise fragile items (not illustrated) like medicine vials containing insulin and syringes shipped to a diabetes patient or to a caretaker of the patient. The fragile payload may be wrapped in a shock-absorbing bio-degradable material 201 like coir. Coir 201 may be provided in the form of a multiple layered blanket wrapped about the payload keeping glass from contacting glass inside the wrap due to placement of the fragile items in different layers of the wrap.

Coir fiber used in this example derives from the fibrous material found between the hard interior shell and the exterior skin of a coconut. The high content of lignin and cellulose in coir renders it one of the strongest natural fibers available. Moreover, the break point strength for coir fibers is perhaps the highest value known for typical natural fiber. Therefore coir 201 is a bio-degradable, low-cost choice for cushioning a payload. In alternative embodiments there are other cushioning materials than coir that may be used as well.

In this application, coir 201 is wrapped about the payload items keeping the items isolated from one another in different layers of the wrap. Wool string 202 may be used to tie the wrap, forming a cushioning bundle with the fragile payload items secure inside the wrap. Referring now back to FIG. 1, tensegrity structure 100 approximates a sphere in this example and has a sphericity value of greater than 0.9. Greater sphericity value provides a more ball-like property that may be desired if, for example, a tensegrity cage with a payload suspended inside is dropped from a UAV to the ground.

Referring again to FIG. 2, a shipping operator may wrap fragile payload items with coir 201 and may tie the wrap off with wool string 202. The shipping operator may then quickly assemble a tensegrity cage-like structure 100 from previously created elementary tensegrity cells. The operator may suspend the wrapped payload 200 at center of tensegrity structure 100 by tying it to the tensegrity structure in a variety of directions with fibrous filaments such as wool string as used to tie off the coir wrap.

Figure 3:
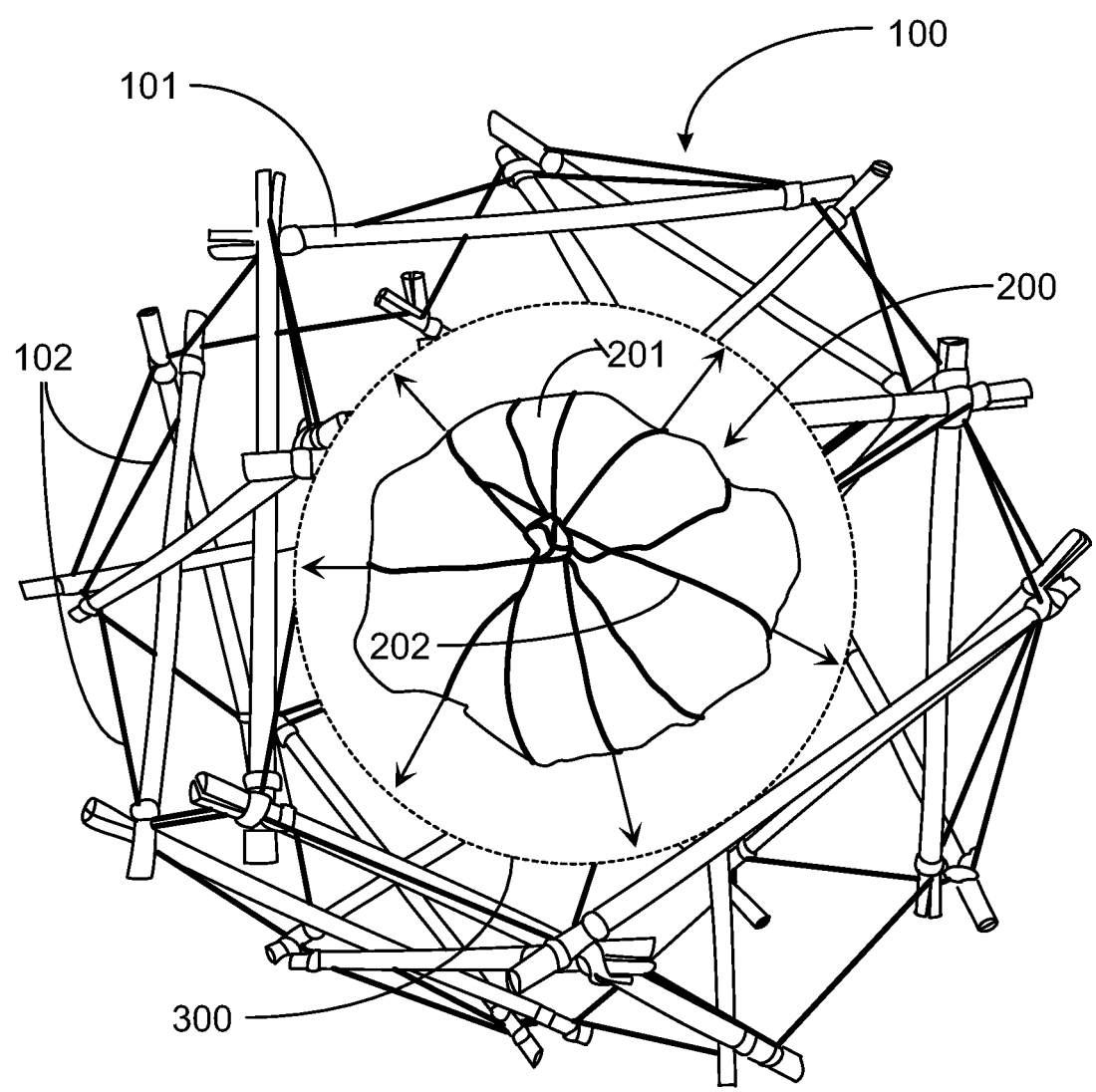
FIG. 3 is view of the structure of FIG. 1 carry a payload as shown in FIG. 2.

FIG. 3 is a perspective view of tensegrity structure 100 of FIG. 1 enclosing payload 200 of FIG. 2 according to an embodiment of the present invention. A portion of tensegrity structure 100 is removed according to a broken boundary 300 for the purpose of clarity. Payload 200 may be suspended within tensegrity structure 100 at proximal center of the apparatus. Payload 200 is wrapped in wool string 202 and may be suspended by tying the payload to the struts 101 of tensegrity 100 according to the directional arrows.

Payload 200 is, in one embodiment, a light-weight payload containing fragile components. The actual weight of payload 200 may have bearing on the spherical diameter of the tensegrity structure and whether wool string may be used to suspend the payload within the tensegrity. An important function of tensegrity structure 100 is to prevent payload 200 from contacting the ground when a UAV drops the tensegrity structure with the suspended payload. Tensegrity structure 100 may be fabricated to form a larger spherical footprint or a smaller spherical print for a certain size and weight of a payload like payload 200 that might be larger in volume and heavier or that might be smaller in volume and lighter.

Figure 4:
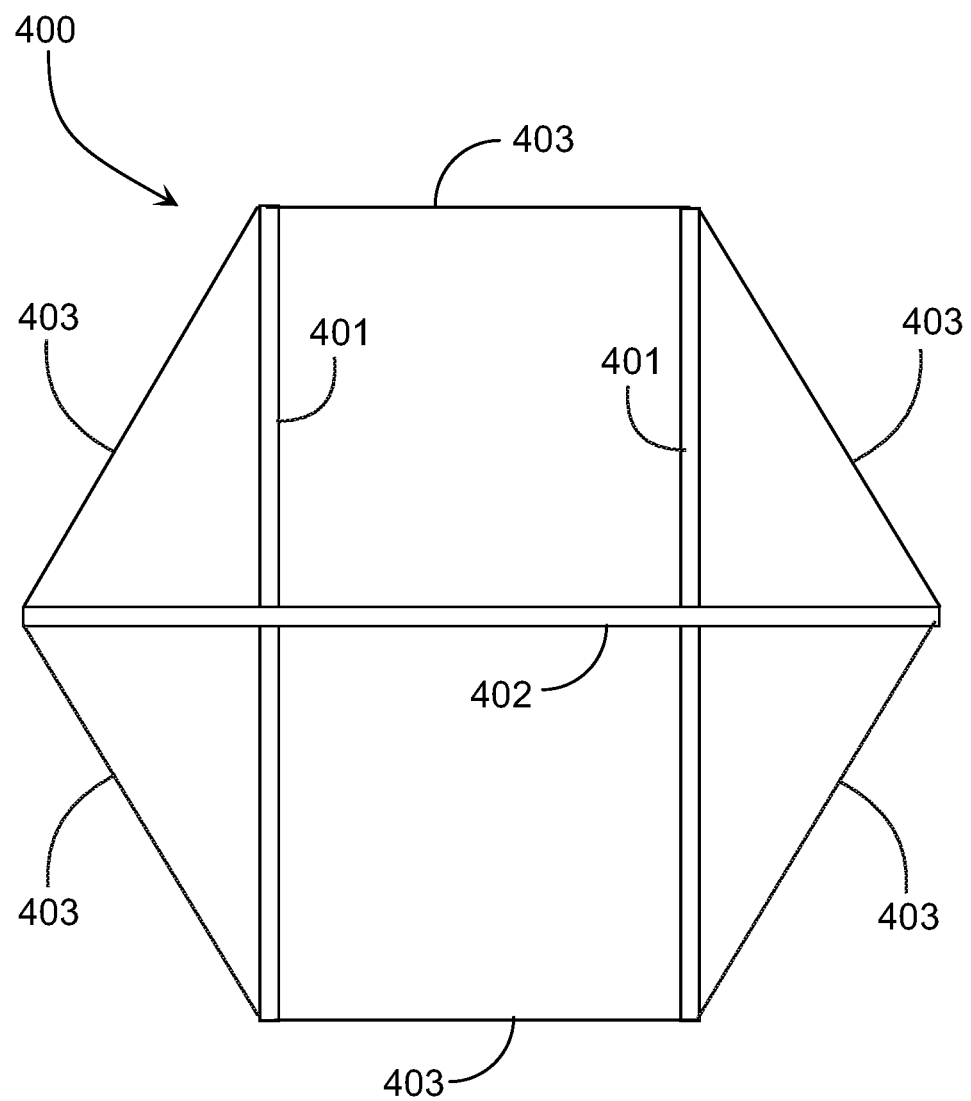
FIG. 4 is structural diagram depicting an architecture for a basic planar tensegrity element in an embodiment of the invention.

FIG. 4 is a plan view of an architecture for a basic planar tensegrity elementary cell 400. In an embodiment of the invention three-dimensional tensegrity structures like structure 100 of FIG. 1 may be assembled from elementary cells. Cell 400 approximates a hexagonal structure, but other shapes are possible, such as square. Elementary cells like elementary cell 400 may be assembled and stored for later access to build a tensegrity structure. A tensegrity structure like structure 100 of FIG. 1 may be completely assembled from the planar elementary cells when a need arises to ship a fragile payload like payload 201 of FIG. 2.

Elementary cell 400 in this example has two vertical struts 401 and one horizontal strut 402. Struts 401 and 402 may be made of wicker cane. Alternative strut materials may be used. Struts 401 and strut 402 may have a nominal diameter of about 9 millimeters. Diameter for the struts may be as low as 7 millimeters or as high as 10 millimeters (9 mm nominal) for a light-weight tensegrity structure like tensegrity structure 100 of FIG. 1. In other embodiments cells may be larger and heavier, built of heavier materials to carry bigger payloads.

Struts in general may be straightened and may be shaped using known manufacturing processes like broaching, for example. Struts may be passed through a broaching machine after a straightening process to remove knots and excess material helping to form a smooth and relatively uniform diameter. A uniform diameter for struts 401 and strut 402 is desired for uniformity in weight distribution and compression state. Jute string tendons are represented in this view by element number 403.

Vertical struts 401 are preferred to be the same length dimension. Horizontal strut 402 is preferred to be slightly longer than struts 401. Typical dimensions for strut length for a tensegrity structure like tensegrity structure 100 of FIG. 1 may be about 19 centimeters for vertical struts 401 and 22 centimeters for horizontal strut 402. The distance between struts 401 may be approximately 10 centimeters. Horizontal strut 402 is placed over top of vertical struts 401 at a relative true position centered vertically and horizontally in this example.

Figure 5:
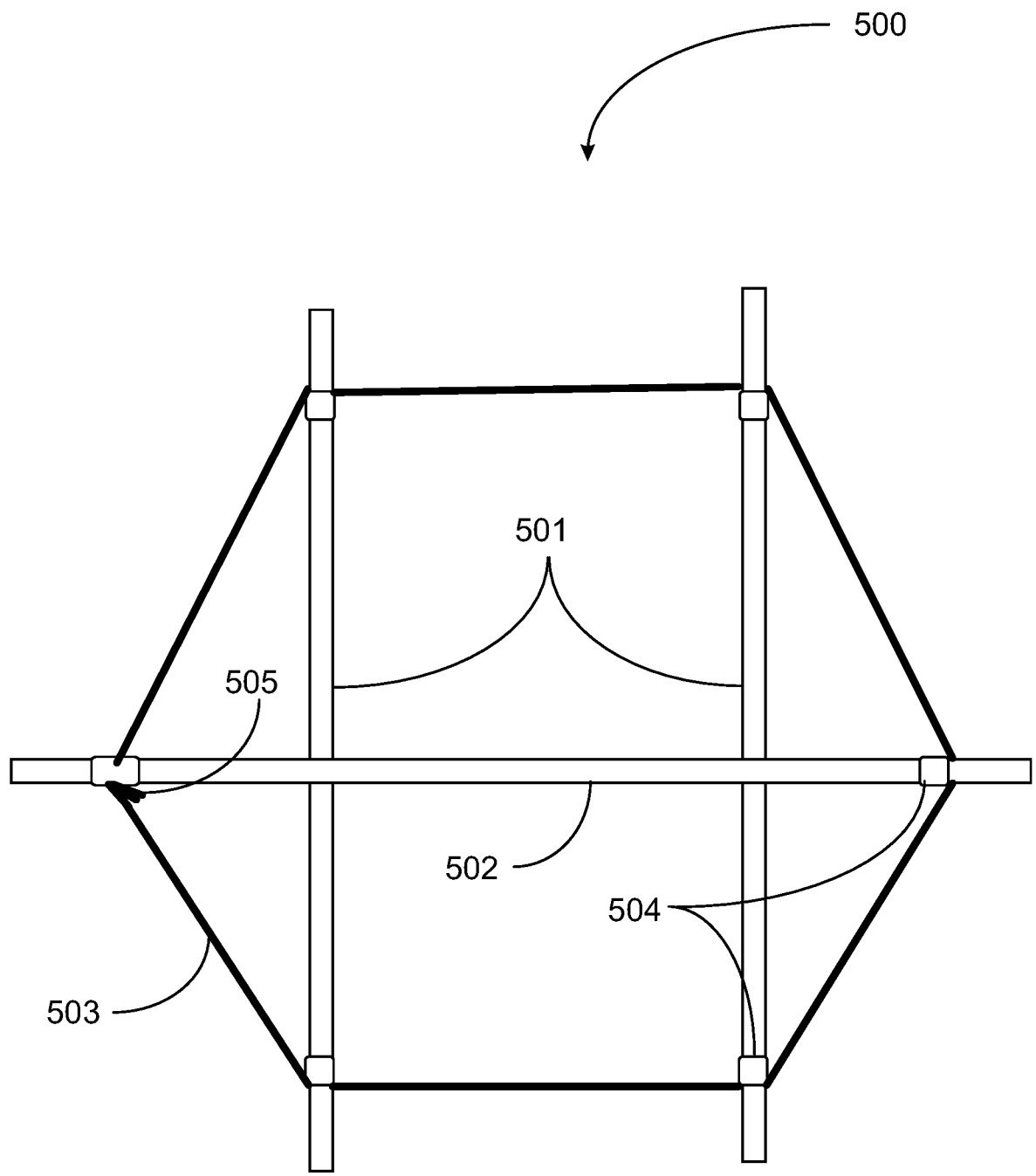
FIG. 5 is a plan view of a tensegrity element according to FIG. 4, showing tendons and struts, and connections in an embodiment of the invention.

FIG. 5 is an elevation view of a planar tensegrity elementary cell 500 completely assembled and wrapped according to an embodiment of the invention. Tensegrity elementary cell 500 includes two vertical struts 501 spaced apart and a horizontal strut 502 positioned roughly at a center position over the vertical struts. The ends of struts 501 and strut 502 are split in this example to a length of about two centimeters to accept jute string tendons 503. As briefly described above, other two-dimensional shapes are possible, which provide for a variety of three-dimensional shapes as well. For example, a square planar element may be used to construct a cubical tensegrity structure, and other polygonal shapes as well.

Jute string tendons 503 are tied off at a tie off points 505 at one end of each of the horizontal struts 501 and 502 in this example. Cotton string wraps 504 are made at each intersect of jute string 503 and struts 501 and 502. Wraps 104 prevent further splitting of the cane material and help keep the jute string tendon anchored in the split ends of the struts. Tensegrity elementary cell 500 has a hexagonal profile after tying and wrapping. The facet length may be about 9 centimeters along the jute string tendon between strut ends. A tensegrity structure like tensegrity structure 100 of FIG. 1 may be assembled from a plurality of hexagonal elementary cells like elementary cell 500 in a manner that each hexagonal face of the elementary cell approximates the shape of an octagon and the tensegrity forms a truncated cube, for example. There may be a variety of ways that elementary cells may be assembled into three-dimensional structures.

Figure 6:
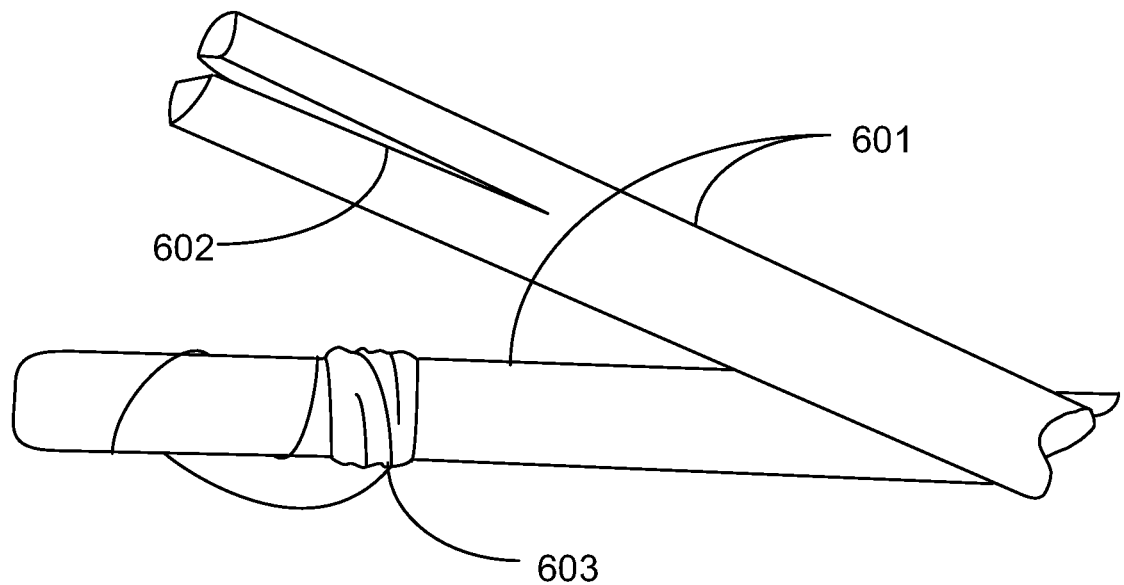
FIG. 6 is a view of ends of struts in an embodiment of the invention.

FIG. 6 is a magnified view of unfinished and finished strut ends 601 according to an embodiment of the present invention. Strut ends 601 are magnified in this view and represent the ends of struts 101 of FIG. 1 and are prepared for use in building a tensegrity structure like structure 100 of FIG. 1.

FIG. 6 depicts a strut end 601 with a spit 602 provided that may be approximately two centimeters long from the end of the strut. Split 602 is provided at both ends of the strut. FIG. 6 also depicts a strut 601 that is wrapped with cotton string to produce wrap 603. The jute string tendon may be assumed present in this example though not illustrated. Cotton wraps 603 reduce the likelihood that the split end will split farther than intended and provide retention of the jute string within the split end. The wrap also adds to the integrity of the joining of the tendon to the end of the strut.

In the creation of elementary structures, when a tendon is joined by he split end to a strut, it is stretched toward the end of another strut to which the tendon is to be joined, so when the tendon is pulled into the split end of the next strut, the tendon itself is placed in considerable tension. This tensioning process is continued as a tendon is wrapped further around an assembly of struts, so an elementary structure is created with tension in all the tendons and resulting compression in all of the struts. In FIG. 6 it is seen that ends of struts with tendons joined may be wrapped with, for example, cotton string or cloth, to finish and stabilize the joint.

Substantially planar elementary structures as shown in FIGS. 5 and 6 may be joined into a three-dimensional structure to protect a payload by joining strut ends of one element to joint ends of other elements and tying the ends together with jute or cotton strands. Joined into a three-dimensional polyhedron structure as shown in FIG. 1 a protective wall is built around a fragile payload.

Figure 7:
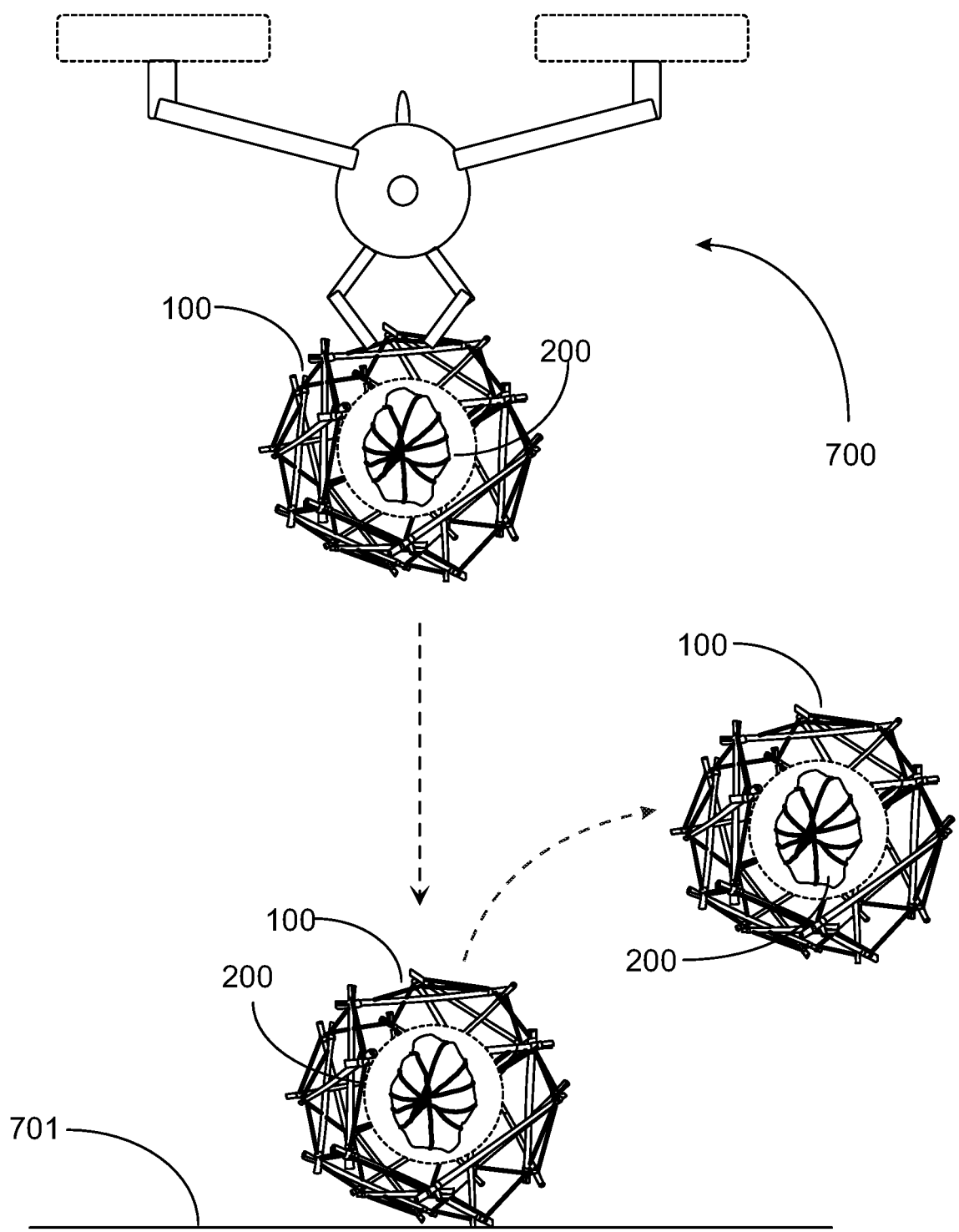
FIG. 7 is a tensegrity structure carrying a payload in an embodiment of the invention, delivered and dropped from an aerial vehicle.

FIG. 7 is a front elevation view of a UAV 700 dropping tensegrity structure 100 with suspended payload 200 to the ground from some height. The apparent height to the ground level in FIG. 7 is misleading, because the structure and the UAV are shown large enough to include detail, and in an actual delivery, the structure carrying the payload may be dripped from a considerable height. The height in delivery from which a structure may be dropped is dependent at least in part on the probability of the structure arriving at a desired place on the ground.

The light weight of fragile payload 200 suspended in tensegrity structure 100 lends to economic delivery of the payload. The fact that tensegrity structure 100 is made of 100 percent biodegradable materials as is the wrap and string securing fragile payload 200 enables packaging materials to be discarded without further treatment. Deliveries may be made over remote areas or during an emergency where materials used to package the fragile payload and the tensegrity structure may be discarded without concern.

UAV 700 may be equipped to grasp the tensegrity structure, fly to a destination, and then release the tensegrity structure with the suspended payload from an altitude deemed appropriate for accuracy. In a usual circumstance, when the tensegrity structure with a payload is dropped from a quadcopter or any unmanned aerial vehicle, due to the unique construction of the structure, the struts compress upon impact to the ground and cause the tensegrity to bounce and roll, thereby dissipating the kinetic energy, gained in the fall, during the impact. Since tensegrities are extremely flexible and compressible structures, they absorb the shock and prevent the shock from being directly transferred to the payload.

FIG. 7 shows structure 100 falling the ground and bouncing. The ball-like shape of a tensegrity polyhedron allows it to bounce and roll, which further helps in shock absorption. Since the payload is suspended in the middle of the tensegrity polyhedron structure, it has minimal to no contact with the ground during impact.

In another circumstance a tensegrity structure might crush on impact over a finite time, and over a finite distance. In this rare instance, the suspension strings keep payload 200 roughly in the center of the approximately spherical boundaries of tensegrity 100 preventing the payload from making contact with the ground. Momentum of the tensegrity structure with the payload is relatively low, as the velocity is limited by the surface area of the structure and the mass is small. In nearly all instances the structure will bounce and roll, but if crushing occurs, the payload is slowed and stopped in a controlled deceleration before the payload strikes the ground.

In one embodiment a tail, similar to a tail of a kite, may be provided and wrapped with the structure, such that the tail plays out as the structure falls, and directs the structure to strike the ground at a predetermined point of the structure, where the cushioning effect may be maximized.

It will be apparent to one with skill in the art that the tensegrity shield system of the invention may be provided using some or all the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

The invention claimed is:

1. A system for delivery of fragile payloads, comprising:
a three-dimensional structure assembled from planar elements made from rigid struts and flexible tendons joining ends of struts, the flexible tendons in tension, placing the struts in compression, the structure having a hollow interior; and
one or more fragile items wrapped in a shock-absorbing bio-degradable material such that no fragile item contacts another, forming a payload bundle, the payload bundle joined by fibrous filaments suspending the payload within the structure;
wherein the structure carrying the payload bundle is carried to a destination by an aerial vehicle and dropped from a height to the ground, where the structure rebounds and rolls, dissipating kinetic energy gained in falling, preventing the payload bundle from striking ground surface.

2. The system of claim 1 wherein the structure is assembled from a plurality of substantially planar polygonal elements, each substantially planar polygonal element comprising crossed, substantially rigid struts with tendons joining strut ends with adjacent nearest strut ends.

3. The system of claim 2 wherein the plurality of substantially planar polygonal elements is joined together into the structure by joining apexes of individual substantially planar polygonal elements to apexes of others of the plurality of substantially planar polygonal elements.

4. The system of claim 1 wherein struts are made of elongated, bio-degradable sticks and may be left on the ground or re-purposed after use.

5. The system of claim 4 wherein the struts are made from rattan or wicker cane.

6. The system of claim 1 wherein the tendons are made from jute string.

7. The system of claim 2 wherein ends of struts are split and the tendons are inserted into the slit ends of the struts, joining the ends of struts in assembling a substantially planar polygonal element.

8. The system of claim 7 wherein tendons are stretched in assembly of substantially planar polygonal element, placing the tendons in tension and the struts in compression.

9. The system of claim 1 wherein the shock-absorbing bio-degradable material is coir formed into a fabric, and the fabric is wrapped around individual instances of fragile items such that no two fragile items in the payload bundle contact.

10. The system of claim 1 wherein the fibrous filaments suspending the payload are wool string.

11. A method for delivery of fragile payloads, comprising:
assembling a structure having an approximately spherical aspect composed of rigid struts and flexible tendons joining ends of struts, the flexible tendons in tension placing the struts in compression, the structure having a hollow interior;
wrapping one or more fragile items in a shock-absorbing bio-degradable material such that no fragile item contacts another, forming a payload bundle;
suspending the payload bundle by fibrous filaments within the structure;
delivering the structure carrying the payload bundle to a destination by an aerial vehicle; and
dropping the structure with the payload bundle to the ground at the destination.

12. The method of claim 11 comprising assembling the structure from a plurality of substantially planar polygonal elements, each substantially planar polygonal element comprising crossed, substantially rigid struts with tendons joining strut ends with adjacent nearest strut ends in the same polygonal element.

13. The method of claim 12 comprising joining the plurality of substantially planar polygonal elements together into the structure by joining apexes of individual substantially planar polygonal elements to apexes of others of the plurality of substantially planar polygonal elements.

14. The method of claim 11 comprising making the struts of elongated, bio-degradable sticks that are left on the ground or re-purposed after use.

15. The method of claim 14 comprising making the struts from rattan or wicker cane.

16. The method of claim 11 comprising making the tendons from jute string.

17. The method of claim 12 comprising splitting ends of struts and inserting the tendons into the slit ends of the struts, joining the ends of struts in assembling a substantially planar polygonal element.

18. The method of claim 17 comprising stretching the tendons in assembly of the substantially planar polygonal elements, placing the tendons in tension and the struts in compression.

19. The method of claim 11 comprising making the shock-absorbing bio-degradable material from coir, forming the coir into a fabric, and wrapping the fabric around individual instances of fragile items such that no two fragile items in the payload bundle contact.

20. The method of claim 11 comprising making the fibrous filaments suspending the payload from wool string.

\* \* \* \* \*